No. 779,253. PATENTED JAN. 3, 1905.
J. W. BAYLISS.
CHAIN BELT FOR TRANSMITTING POWER.
APPLICATION FILED MAY 9, 1904.
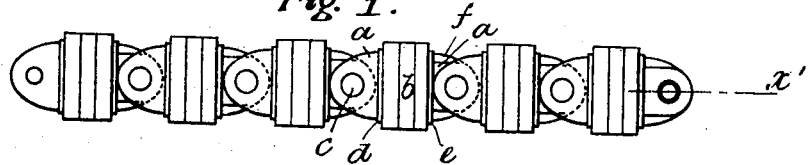
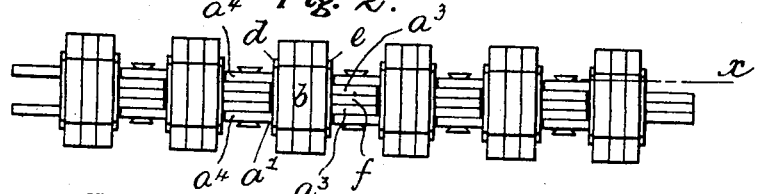
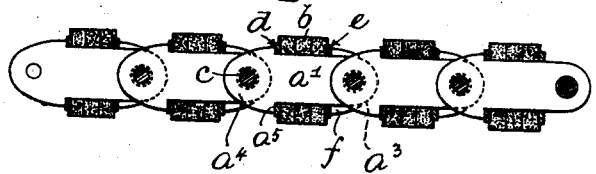
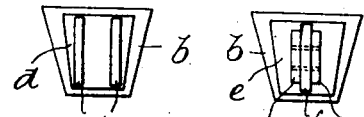
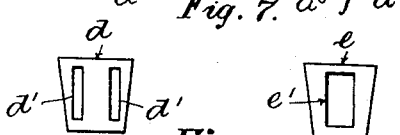
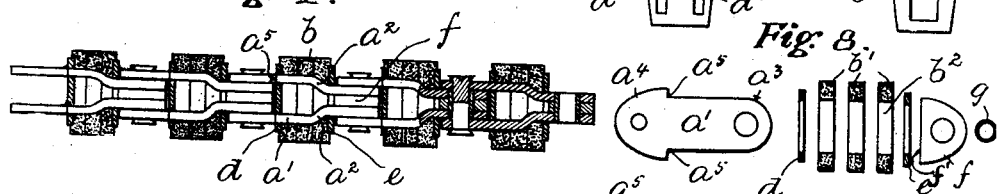
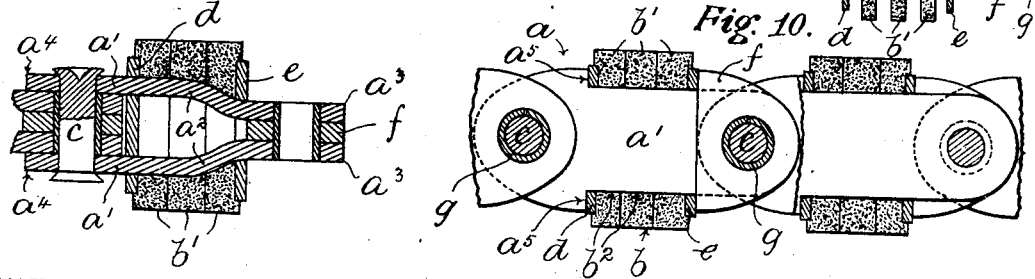
WITNESSES
INVENTOR James W. Bayliss No. 779,253.

Patented January 3, 1905.

UNITED STATES PATENT OFFICE.

JAMES WILLIAM BAYLISS, OF BIRMINGHAM, ENGLAND.

CHAIN BELT FOR TRANSMITTING POWER.

SPECIFICATION forming part of Letters Patent No. 779,253, dated January 3, 1905.

Application filed May 9, 1904. Serial No. 207,109.

*To all whom it may concern:*

Be it known that I, JAMES WILLIAM BAYLISS, manager of department, a subject of the King of Great Britain, residing at 36 Lancaster street, Birmingham, England, have invented certain new and useful Improvements in Chain Belts for Transmitting Power, of which the following is a specification.

This invention has relation to chain belts or composite metal and leather or like chains (principally adapted to be driven and to drive by frictional contact with grooved or other pulleys) for transmitting power and rotary motion in motor-cycles, motor-driven vehicles, and other machinery and apparatus, in lieu of the ordinary leather driving-belts, which are liable to become stretched by use, and so rendered inefficient.

The said invention consists in an improved form or construction of composite chain belt in which a chain of flexibly-connected steel or other links is combined with a series of friction driving-blocks of leather or similar non-metallic substance suitable for making effective frictional contact or grip upon the faces of the peripheral grooves of motor-cycles and like pulleys, the said blocks being built up around or threaded longitudinally upon the component links of the chain in such a manner that while insuring a maximum of strength and efficiency as a power-transmitting medium perfect flexibility and ease and smoothness of running are insured, and the chain belt will wear for a long time without stretching, further advantages of the improved construction being that the driving-pull of the chain upon the blocks or pads is applied in or about the centers of the said blocks, while owing to the fact that the whole of the component metallic links (which constitute carriers for the driving-blocks) can be made of the same pattern, and therefore interchangeable, the chain belt can be readily shortened or lengthened by removing or adding one or more links, as circumstances may require. By the use of such chain belts many of the advantages of positive chain and tooth wheel drive can be obtained, but without its attendant disadvantages.

Figure 1 of the accompanying drawings represents a side elevation of a length of a composite chain belt comprising a series of wedge-section leather driving-blocks built up around or threaded longitudinally upon the flexibly-jointed links of a metallic chain in accordance with one form of this invention. This pattern of chain belt is particularly adapted for the transmission of power in motor-cycles having V-grooved driving-pulleys. Fig. 2 is an under side plan of the said length of chain belt. Fig. 3 is a longitudinal vertical section of same taken upon the dotted line $x$ and showing how the driving-blocks are threaded centrally onto the links, the side plates of which are provided near the leading ends with shoulders or stops for positioning the said blocks, while the other or following ends of the links are fitted with thrust-plates which serve as abutments for taking the longitudinal thrust exerted by the blocks when pull is being applied along the chain in transmitting power. Fig. 4 is another view of the chain belt, some of the links with their driving-blocks in complete horizontal section upon the dotted line $x'$, while in other links the blocks only are shown in section. Fig. 5 is an elevation of the leading end of one of the links, and Fig. 6 a similar view of the following end. Fig. 7 represents the metal washers or end plates, which are also threaded on the links of the chain and serve to strengthen or reinforce the leather driving-blocks. Fig. 8 shows in different views the several component parts of one of the composite links separated or disassembled from one another. Fig. 9 represents one of the composite links in horizontal section, as in Fig. 4, but same are drawn upon a much larger scale in order to more clearly show the construction. Fig. 10 is a longitudinal section of two links upon the same scale as Fig. 9.

The same letters of reference indicate corresponding parts in the several figures of the drawings.

$a$ represents the metallic links of the chain, and $b$ represents the leather frictional driving-blocks which are carried by the said links. The links are all of a counterpart and interchangeable form, and each consists of a pair of steel side plates $a'$, cranked inward at $a^2$, so that the rearward or following ends $a^3$ come closer together than the forward or leading ends $a^4$, and thus admit of the following end of each link being inserted within the space between the separated leading ends of the side plates of the next link, to which they are secured and flexibly connected by a joint pin or rivet $c$, passed through coincident holes provided for its reception in the meeting ends of the several plates of the two links. The edges of the side plates are formed near the leading ends with stop-shoulders $a^5$ for positioning the leather driving-blocks, which are made up of a series of layers $b'$ of material shaped according to the section of block required and provided with central holes or piercings $b^2$ to admit of them being threaded longitudinally upon or over the side plates in assembling the parts. End plates or stiffening-washers $d$ are also threaded upon the side plates and up to the shoulders $a^5$ in advance of the blocks, so as to strengthen or reinforce the said blocks and afford an extended bearing therefor, and these washers or plates may be also utilized as lateral stays or distance-pieces for preventing the crushing in of the side plates, in which case (as in the arrangement shown) they are formed with parts of upright separated slots $d'$, wherethrough the side plates are respectively passed. A similar stiffening and abutment plate $e$, having a single slot $e'$, is also threaded upon the side plates behind the driving blocks or pads, and in order to retain these strung-together component parts in position upon the carrier-links a thrust-plate $f$, having a flat inner edge $f'$, opposed to the washer or end plate $e$, is inserted between the rearward or following ends of the side plates, and these plates may be secured together by an inserted bush or eyelet, such as $g$, wherethrough the joining-up pin or rivet $c$ is passed. This thrust-plate then serves to take the rearward thrust which the driving-block exerts upon its carrier-link when being pulled round in frictional contact with the surface of a grooved pulley.

The frictional driving blocks or pads may be either built up from layers or plates of leather or other material or they may be formed solid, and they may be made of any shape in transverse section, according to the sectional form or shape corresponding or suitable to the pulleys with which they are to be used, and any suitable provision may be made for retaining or securing the said threaded-on blocks upon their carrier-links and for strengthening or reinforcing and protecting same and preserving their shape. It is also to be understood that the body or carrier links may be built up and flexibly connected in any convenient manner other than that hereinbefore described by way of example, and for convenience in shortening or lengthening the composite chain belt it is proposed to connect a certain number of the counterpart interchangeable links together by means of a pin and nut, so that any link can be easily unfastened and removed for shortening the chain. It is also to be understood that although it is preferable to thread the blocks or pads centrally upon the links, so that the driving-pull shall be exerted centrally, yet the blocks may nevertheless be threaded on eccentrically, so that the bottoms of the blocks will depend to a greater distance below the under sides of the links.

Having fully described my invention, what I desire to claim and secure by Letters Patent is—

1. In composite indistensible chain belts for transmitting power, the combination with a chain formed of flexibly-connected and indistensible metallic carrier-links, of a series of non-metallic incompressible friction driving devices threaded longitudinally upon and secured to said links.

2. In composite indistensible chain belts for transmitting power, the combination with indistensible metallic carrier-links and incompressible friction driving-blocks threaded to the links, of thrust and retaining plates secured to the link-plates and outward of said blocks.

3. In composite indistensible chain belts for transmitting power, the combination with the links of a metallic chain and incompressible driving devices threaded upon the links, of end plates threaded upon the links for stiffening and reinforcing the driving devices, thereby preserving the shape thereof.

4. In composite chain belts for transmitting power, the combination with metallic indistensible carrier-links and driving-blocks threaded thereto, of end plates threaded on the links for reinforcing the blocks and preserving their shape, and thrust and retaining plates suitably secured to the links and outward of the driving-blocks.

5. A composite indistensible chain belt embodying flexibly-connected and indistensible metallic carrier-links, and non-metallic and incompressible driving devices secured directly to said links.

6. A composite indistensible chain belt embodying flexibly-connected and indistensible carrier-links, and non-metallic and incompressible friction driving devices threaded longitudinally upon and secured directly to said links.

In testimony whereof I have hereunto set my hand in presence of two subscribing witnesses.

JAMES WILLIAM BAYLISS.

Witnesses:
HENRY SKERRETT,
EDITH HELLABY.